United States Patent [19]

Brown et al.

[11] Patent Number: 4,767,381
[45] Date of Patent: Aug. 30, 1988

[54] BOOT RESTRAINT FOR PLUNGING UNIVERSAL JOINT

[75] Inventors: Danny D. Brown, Livonia; Daniel W. Hazebrook, Detroit; Francis L. Fillmore, Birmingham, all of Mich.

[73] Assignee: GKN Automotive Components Inc., Auburn Hills, Mich.

[21] Appl. No.: 61,010

[22] Filed: Jun. 12, 1987

Related U.S. Application Data

[63] Continuation of Ser. No. 814,920, Dec. 30, 1985, abandoned.

[51] Int. Cl.⁴ .................................. F16D 3/21
[52] U.S. Cl. ............................. 464/146; 464/173; 464/906
[58] Field of Search ................... 277/189, 212 FB; 464/111, 133, 145, 146, 173, 175, 905, 906

[56] References Cited

U.S. PATENT DOCUMENTS

| | | | |
|---|---|---|---|
| 3,440,836 | 4/1969 | Petersen | 464/173 X |
| 3,822,570 | 7/1974 | Fisher | 464/146 |
| 3,858,412 | 1/1975 | Fisher et al. | 464/146 |
| 4,319,467 | 3/1982 | Hegler et al. | 464/133 X |
| 4,320,632 | 3/1982 | Dore | 464/111 |
| 4,592,556 | 6/1986 | Nieman et al. | 464/133 X |

FOREIGN PATENT DOCUMENTS

| | | | |
|---|---|---|---|
| 2314770 | 11/1973 | Fed. Rep. of Germany | 464/173 |
| 2927648 | 1/1981 | Fed. Rep. of Germany | 464/146 |
| 2085097 | 4/1982 | United Kingdom | 464/173 |

Primary Examiner—Daniel P. Stodola
Attorney, Agent, or Firm—Remy J. VanOphem

[57] ABSTRACT

A nonmetallic boot restraint for restraining and shrouding the flexible boot of an automotive propshaft constant velocity universal joint of the plunging type. The boot restraint is preferably formed from a puncture-resistant, semi-rigid organic material, such as Nylon (polyamide), and it can be repeatedly assembled to and disassembled from the drive joint without damage to either the boot restraint or the associated boot. An end of the boot restraint traps an end of the boot in sealing engagement with the outside surface of the outer joint member of the drive joint, and a removable clamp maintains this relationship between the outer joint member, the boot, and the boot restraint.

32 Claims, 2 Drawing Sheets

BOOT RESTRAINT FOR PLUNGING UNIVERSAL JOINT

This is a continuation, of application Ser. No. 814,920, filed Dec. 30, 1985, now abandoned.

BACKGROUND OF THE INVENTION

1. Field of the Invention

This invention relates to a shroud for surrounding and restraining the movement of the flexible boot of a constant velocity universal joint of the plunging type, a type of universal joint that is widely used to join a propshaft in an automotive drive system to the differential.

2. Description of the Prior Art

Prior art automotive propshaft constant velocity universal joints of the plunging type typically include an outer joint member that is open at one end and has rectilinear grooves extending into the inside of the open end, an inner joint member that has an end that is inserted into the open end of the outer joint member and has grooves in the end that extends into the open end of the outer joint member, balls or other torque transmitting devices that extend between the grooves of the inner joint member and the grooves of the outer joint member to permit the transmission of torque from one of such joint members to the other, while permitting both angular and axial or plunging movement between the joint members, and a flexible boot in the form of a sleeve that has one end sealed to the inner joint member and the other end sealed to the outer joint member to retain grease in the region of the relatively moving parts of the joint and to prevent such relatively moving parts from being contaminated by water or dirt or other contaminants that it may encounter in normal service.

An automotive propshaft constant velocity universal joint of the foregoing type is subject to operation at relatively high rotational speeds, and such rotational speeds impart centrifugal force to the flexible boot which can cause the flexible boot to distort or balloon out in service, partly due to the mass of the boot and partly due to the mass of the grease that is contained within the boot, which also experiences such centrifugal forces. Such distortion of the boot can lead to a failure of the grease seal between the boot and the outer joint member, which inherently has a larger diameter than the inner joint member, and it permits the grease to be thrown away from the region of the relatively moving parts of the joint by virtue of the ballooning out of the boot and the centrifugal forces acting on the grease, thus, posing the danger of inadequate lubrication of the relatively moving parts of the joint during a time of high speed operation when proper lubrication is most important.

The problems arising from the distortion of the flexible boot of an automotive propshaft constant velocity universal joint have heretofore been dealt with by the use of a spun metal boot restraint that surrounds the portion of the boot that is sealed to the outer joint member to maintain the seal between the boot and the outer joint member and to restrain outward movement of the portion of the boot that is near the outer joint member, which is inherently the portion of the boot that has the largest diameter and is the most subject to distortion due to centrifugal force. Such a spun metal boot restraint is described in U.S. Pat. No. 3,822,570 (Fisher). A spun metal boot restraint of the type described in the aforesaid U.S. Pat. No. 3,822,570 is partially roll formed in place, and the rolling action that is needed to complete the forming of the restraint tends to cause twisting of the boot which can lead to premature boot failure. Also, once the spun metal boot restraint is in place, it cannot be removed without destruction of such boot restraint, and usually without destruction of the boot itself and, therefore, the servicing of a plunging constant velocity universal joint that utilizes such a spun metal boot restraint is difficult and expensive.

SUMMARY OF THE INVENTION

According to the present invention there is provided a constant velocity universal joint of the plunging type that incorporates a boot restraint that is preformed from a semi-rigid organic material and can be readily applied to the universal joint without the need for spinning or rolling operations, thereby avoiding twisting of the flexible boot of the joint during the assembly of the boot restraint. Further, the boot restraint of the present invention may readily be removed from the joint for servicing of the joint and without destroying the boot restraint or the boot, to permit the reuse of the boot restraint and the boot in the serviced joint, if they were otherwise fit for reuse at the time of the disassembly of the joint for service.

The boot restraint of the present invention is preferably formed from a Nylon (polyamide) or other semi-rigid, puncture-resistant polymeric material, for example, by injection molding, and a boot restraint formed in this way will have sufficient resiliency to be capable of assembly by distortion to an outer joint member that has an outside diameter that is slightly greater than the normal or undistorted inside diameter of the boot restraint.

Accordingly, it is an object of the present invention to provide a constant velocity universal joint of the plunging type which incorporates a non-metallic restraint for restraining movement of the flexible boot of such universal joint.

It is a further object of the present invention to provide a boot restraint for a constant velocity universal joint of the plunging type which can be assembled to the joint without a rolling operation, and which thereby helps to ensure that the flexible boot will not be twisted during the assembly of the boot restraint to the joint.

It is a further object of the present invention to provide a boot restraint for a constant velocity universal joint that can be removed from the joint to permit servicing of the joint without destruction or damage to the boot restraint or the flexible boot, to thereby permit the reuse of the boot restraint and the flexible boot.

For a further understanding of the present invention and the objects thereof, attention is directed to the drawing and the following description thereof, to the detailed description of the preferred embodiment, and to the appended claims.

DETAILED DESCRIPTION OF THE PREFERRED EMBODIMENT

Figure 1:
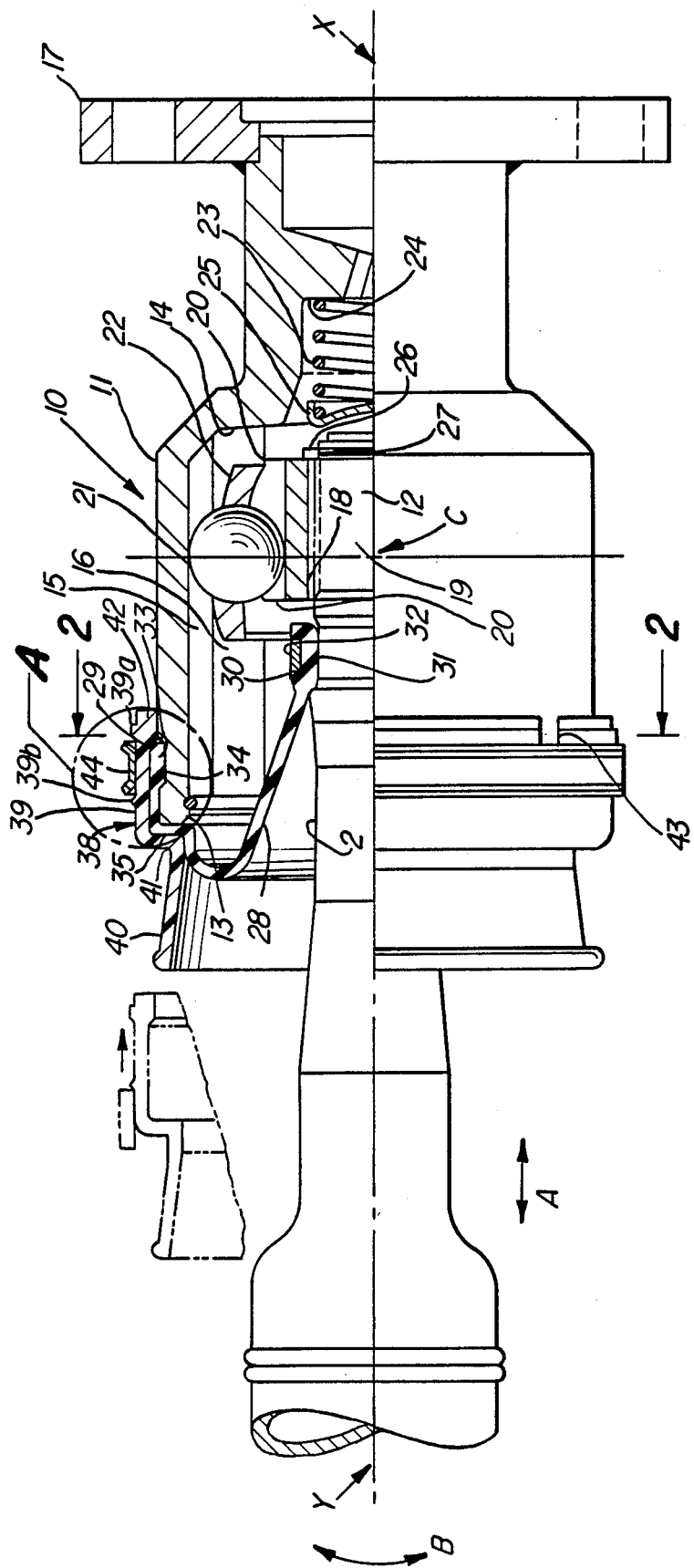
FIG. 1 is a fragmentary elevational view, partly in crosssection, of an automotive propshaft which incorporates a constant velocity universal joint of the plunging type according to the present invention.
Figure 4:
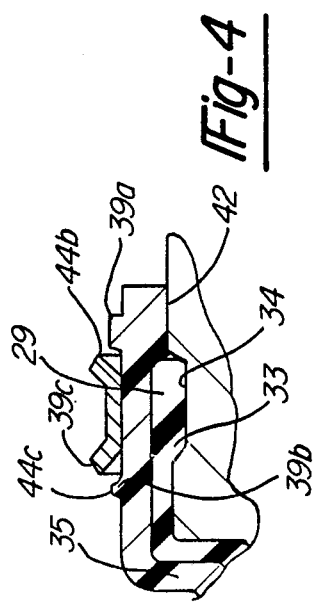
FIG. 4 is an exploded partial sectional view of the elements shown in circle A of FIG. 1.
Figure 2:
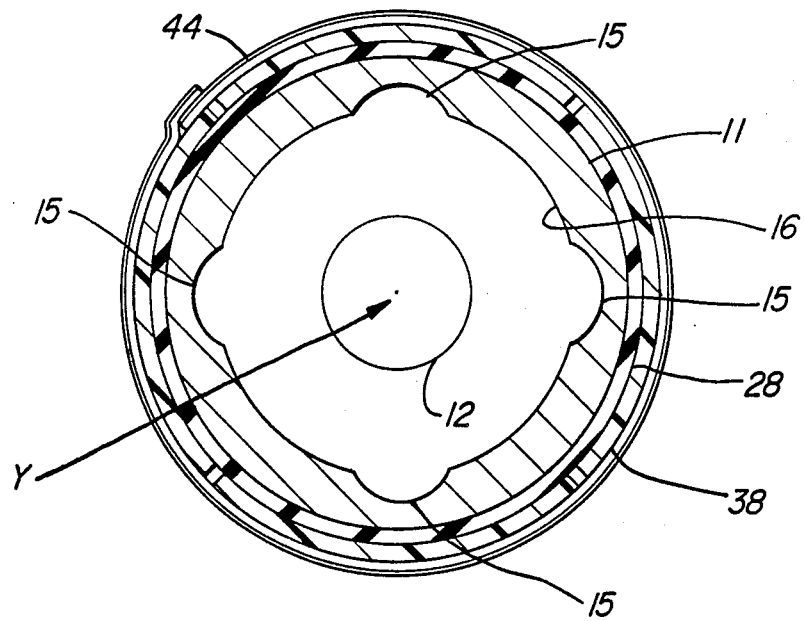
FIG. 2 is a cross-sectional view taken on line 2—2 of FIG. 1.

FIG. 1 illustrates a universal joint, indicated generally by reference numeral 10. The universal joint 10 is of a general type that is well-known in the prior art and, accordingly, many of its individual components will not be described in detail herein. In any case, the universal joint 10 has a generally cylindrical outer joint member 11 and an inner joint member 12. The outer joint member 11 has a longitudinal central axis identified by reference character X, and the inner joint member 12 has a longitudinal central axis that is identified by reference character Y. In the orientation of the inner joint member 12 relative to the outer joint member 11, as depicted in FIG. 1, the longitudinal central axis X of the outer joint member 11 and the longitudinal central axis Y of the inner joint member 12 are aligned with one another.

The outer joint member 11 has an open end 13 that faces the inner joint member 12, and the outer joint member 11 also has a closed end 14 that is disposed away from the open end 13 of the outer joint member 11.

The outer joint member 11 has a plurality of rectilinear grooves 15, and the rectilinear grooves 15 are in the inside surface 16 of the outer joint member 11 and extend into the outer joint member 11 from the open end 13 thereof. The outer joint member 11 is affixed at its end that is away from the inner joint member 12 to a flange 17, as by welding, by which torque may be imparted to the outer joint member 11 in a universal joint 10 where it is the driving member or, conversely, to receive torque from the outer joint member 11 in a universal joint 10 where it is the driven member. The inner joint member 12 has an end 20 which is disposed within the open end of the outer joint member 11, and has a plurality of rectilinear grooves 19 therein. The inner joint member 12 is mounted to a drive or propeller shaft 2 for rotation therewith utilizing a spline or key drive arrangement 18. The rectilinear grooves 19 in the inner joint member 12 are radially aligned with the rectilinear grooves 15 in the outer joint member 11, and a plurality of spherical balls 21, only one of which is shown in the drawing, are positioned to extend between the rectilinear grooves 19 in the inner joint member and the rectilinear grooves 15 in the outer joint member 11 to provide for the transmission of torque from the outer joint member 11 to the inner joint member 12, in cases where the outer joint member 11 acts as the driving member of the universal joint 10 or, conversely, from the inner joint member 12 to the outer joint member 11 in cases where the inner joint member 12 acts as the driving member of the universal joint 10. The spherical balls 21 are rotatable within suitably shaped recesses of a ball cage 22, and each spherical roller ball 21 is also rollable within the rectilinear groove 15 of the outer joint member 11 and the rectilinear groove 19 of the inner joint member 12 which contain such spherical ball 21. By virtue of the construction of the universal joint 10, as heretofore described, the inner joint member 12 is free to move within the open end 13 of the outer joint member 11 along the central axis X of the outer joint member 11, as is indicated by the double ended straight arrow A in the drawing figure, and it is free to pivot with respect to the outer joint member 11 about a point C lying at the intersection of a plane through the centers of the spherical balls 21 and the central axis X of the outer joint member 11, as is indicated by the double-ended arcuate arrow B in the drawing figure. Typically, the angular movement of the inner joint member 12 with respect to the outer joint member 11, which is sometimes referred to as articulation, is of the order of twenty degrees in each direction from the central axis X of the outer joint member 11 for a typical automotive propshaft constant velocity universal drive joint application.

The inner joint member 12 is normally biased toward the open end 13 of the outer joint member 11 by means of a spring 23 which is compressed between a shoulder 24 of the closed end 14 of the outer joint member 11 and a shaped plate 25 that bears against the end of the drive shaft 2. The inner joint member 12 is maintained in a fixed position on the end of the drive shaft 2 by means of a ring stop 26 that is contained within a complementally-shaped groove 27 in the outer surface of the drive shaft 2. It is to be noted here that certain types of propshafts utilize plunging constant velocity universal joints which do not utilize springs corresponding to the spring 23, and that the boot restraint of the present invention is also applicable to such plunging constant velocity universal joints.

To lubricate the movement of the spherical balls 21 in the respective rectilinear grooves 15 of the outer joint member 11 and the rectilinear grooves 19 of the inner joint member 12 and the roller ball cage 22, the open end 13 of the outer joint member 11 is normally packed with a suitable lubricating grease. The lubricating grease is retained within the open end 13 of the outer joint member 11 by means of a boot 28 that has a first end 29 that is sealingly affixed to the outside surface of the outer joint member 11 and a second end 30 that is sealingly affixed to the outside surface of the inner joint member 12. The boot 28 must be capable of accommodating the axial and angular displacement of the inner joint member 12 with respect to the outer joint member 11 and, therefore, the boot 28 is formed of a flexible material, such as an elastomeric material. The second end 30 of the boot 28 is contained within a complementally shaped groove 31 in the drive or propeller shaft 2 adjacent the inner joint member 12, and is normally retained in such position by means of a removable retaining ring 32. The first end 29 of the boot 28 is retained in a fixed position relative to the open end 13 of the outer joint member 11 by providing the first end 29 of the boot 28 with a radially inwardly projecting rib 33 and by providing the outer surface of the open end 13 of the outer joint member 11 with a radially inwardly projecting recess 34 to receive the radially inwardly projecting rib 33 of the boot 28. The boot 28 also has a radially extending portion 35 that extends inwardly from an interior portion of the first end 29 of the boot 28 to lie in surface-to-surface contact with the front edge of the outer joint member 11 and to thereby form a seal with the outer joint member 11 both at the outside circumferential surface of the outer joint member 11 and along the front face of the outer joint member 11.

The first end 29 of the boot 28 is retained in its desired position with respect to the open end 13 of the outer joint member 11 by means of a shaped boot restraint 38 that also partially shrouds the boot 28 to prevent its inadvertent rupture or puncture and to help prevent the boot from ballooning out when the universal joint 10 is rotated at a relatively high rotational speed due to the inertia of the boot 28 and the inertia of the grease that is contained within the universal joint 10 thereby avoiding the need to use excessive amounts of grease to ensure lubrication during this ballooning action. The boot restraint 38 is formed in a single piece from a suitable semi-rigid, puncture-resistant organic material, such as a Nylon material (a polyamide material), and a DuPont "Super Tough Nylon ST 801" has been found to be suitable for the manufacture of a boot restraint 38 when such boot restraint is manufactured by injection molding. The boot restraint 38 has a first portion 39 which extends generally cylindrically, a second portion 40 which is generally frustoconically shaped, and a radially extending connecting portion 41 which extends between the first cylindrical portion 39 of the boot restraint 38 and the generally frustoconically shaped second portion 40. The boot restraint 38 also has a radially inwardly projecting rib 42 which extends beyond the first end 29 of the boot 28 and is normally in an interference fit therewith by virtue of the fact that the inside diameter of the radially inwardly projecting rib 42 of the boot restraint 38 is less than the outside diameter of the first end 29 of the boot 28, the first cylindrical portion 39 of the boot restraint 38 having a plurality of circumferentially spaced apart slots 43 therein to permit the boot restraint 38 to be snapped over the first end 29 of the boot 28. After the first cylindrical portion 39 of the boot restraint 38 is positioned over the first end 29 of the boot 28, it is secured in such position by means of a removable clamp 44, and by removing the removable clamp 44, the boot restraint 38 and the boot 28 may be removed from the open end 13 of the outer joint member 11 to permit servicing of the universal joint 10, without risk of damaging the boot 28 and the boot restraint 38 during the removal so as to permit the reuse of the boot 28 and the boot restraint 38 with the universal joint 10 after the servicing of the universal joint 10 is completed.

Figure 3:
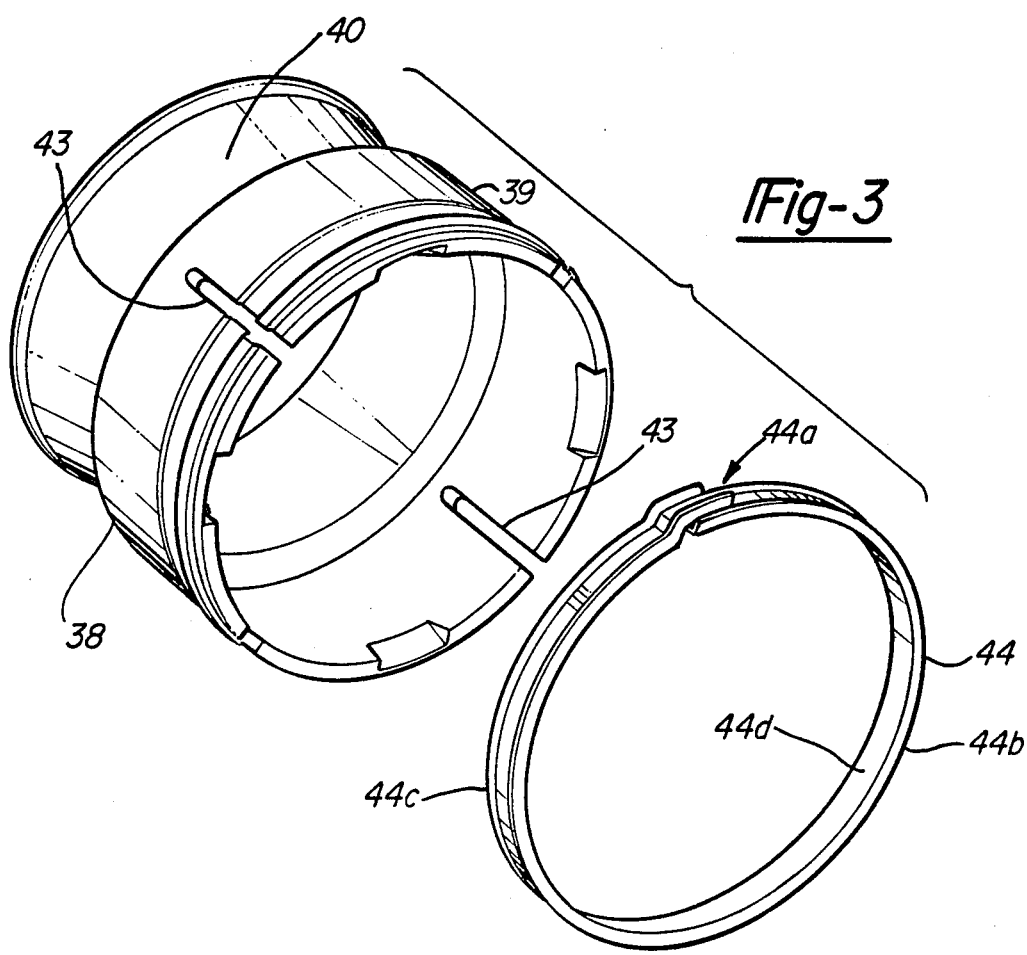
FIG. 3 is a perspective exploded view showing certain of the elements of the constant velocity universal joint of FIGS. 1 and 2.

The removable clamp 44 is formed from a double ended band of a metallic material, such as steel, by lapping the ends of such band, as is shown at 44a in FIG. 3, and by spot welding the lapped ends to one another. The removable clamp 44 has leading edges 44b and 44c, respectively, which taper radially outwardly from an intermediate connecting portion 44d that is of cylindrical configuration. The removable band is secured in its assembled position, as shown in FIG. 1, between spaced apart, outwardly projecting ribs 39a and 39b of the first cylindrical portion 39 of the boot restraint 38. The rearmost of the outwardly projecting ribs 39a and 39b, namely outwardly projecting rib 39b, has an outer surface, surface 39c, which tapers inwardly and radially outwardly. This permits the removable clamp 44 to be moved into position between the outwardly projecting ribs 39a and 39b by sliding it inwardly and upwardly over the outer surface 39c of the outwardly projecting rib 39b, especially in view of the deformability that is inherent in the boot 28 and the boot restraint 38 by virtue of the organic materials from which they are formed.

The radially extending connecting portion 41 of the boot restraint 38 is so positioned with respect to the radially inwardly projecting rib of the cylindrical portion of the boot restraint 38 that it will compress the radially extending portion 35 of the boot 28 against the front surface of the open end 13 of the outer joint member 11, thus, ensuring a double seal between the boot 28 and the open end 13 of the outer joint member 11. The small end of the frustonically shaped second portion 40 of the boot restraint 38 is positioned to contact an outer portion of the boot 28 as the inner joint member 12 moves axially with respect to the outer joint member 11 to prevent its ballooning out during the rotation of the universal joint 10, to thereby ensure that the grease contained within the universal joint 10 wil stay in contact with the spherical balls 21 of the universal joint 10, and the surfaces of the rectilinear grooves 15 of the outer joint member 11 and the rectilinear grooves 19 of the inner joint member 12 and the roller ball cage 22 during the operation of the universal joint 10 to ensure proper lubrication of these elements during the operation of the universal joint 10. The frustoconical shaped second portion 40 of the boot restraint 38 also serves to shroud the boot 28 to thereby protect it from puncturing due to contact with rocks or other road hazards encountered during normal use.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A torque transmitting mechanical joint of the plunging type adapted for driving a drive shaft, said torque transmitting mechanical joint comprising:

a generally cylindrical outer joint member having a central axis, said outer joint member being open at one end and having a radially inwardly projecting recess in said one end, the inner surface of said open end of said outer joint member having rectilinear groove means extending thereinto;

an inner joint member having a central axis, said inner joint member being received in said open end of said outer joint member, said central axis of said inner joint member normally being co-axial with said central axis of said outer joint member, said inner joint member further having groove means therein;

torque transmitting means extending between said groove means in said inner joint member that is received in said open end of said outer joint member and said rectilinear groove means extending into said open end of said outer joint member to transmit torque from one of said inner joint member and said outer joint member to the other of said inner joint member and said outer joint member, said torque transmitting means being slidable in said groove means of said inner joint member and said rectilinear groove means extending into said open end of said outer joint member to permit limited angular articulation of said central axis of said inner joint member and said central axis of said outer joint member with respect to one another and to permit limited axial movement of said inner joint member that is received within the open end of said outer joint member along said central axis of said outer joint member;

an annular sealing member formed from a flexible organic material and having a first end and a second end, one of said first end and said second end of said annular sealing member having a radially inwardly projecting rib that sealingly engages said radially inwardly projecting recess of said outer joint member, the other of said first end and said second end of said annular sealing member sealingly engaging said drive shaft, said one of said first end and said second end of said annular sealing member having an outside diameter; and an elastically distortable annular retaining member that is formed from an organic material which is less flexible than the material of said annular sealing member, said elastically distortable annular retaining member having a first end portion and a second end portion, one of said first end portion and said second end portion of said elastically distortable annular retaining member having a generally cylindrical portion, said generally cylindrical portion having a predetermined inside diameter terminating in a generally radially inwardly extending rib contiguous said annular sealing member, said radially inwardly extending rib having a second predetermined inside diameter, said second predetermined inside diameter being normally less than said outside diameter of said one of said first end and said second end of said annular sealing member, said elastically distortable annular retaining member being elastically distortable such that said radially inwardly extending rib of said generally cylindrical portion of said elastically distortable annular retaining member can be distorted to a diameter that is greater than said outside diameter of said one of said first end and said second end of said annular sealing member to permit said generally cylindrical portion of said one of said first end portion and said second end portion of said elastically distortable annular retaining member to be placed over said outside diameter of said one of said first end and said second end of said annular sealing member by the application of a distorting force to said generally cylindrical portion of said elastically distortable annular retaining member such that said generally cylindrical portion of said one of said first end portion and said second end portion of said elastically distortable annular retaining member is retained by the interference between said second predetermined inside diameter of said radially inwardly extending rib and said outside diameter of said one of said first end and said second end of said annular sealing member upon removal of said distorting force.

2. A torque transmitting mechanical joint according to claim 1 further comprising:

removable retaining means surrounding said one of said first end and said second end of said elastically distortable annular retaining member to maintain said interference between said generally radially inwardly extending rib and said outside diameter of said one of said first end and said second end of said annular sealing member.

3. A torque transmitting mechanical joint according to claim 2 wherein said one of said first end portion and said second end portion of said elastically distortable annular retaining member has an outer surface and generally radially outwardly facing groove means in said outer surface and further wherein said removable retaining means is positioned in said generally radially outwardly facing groove means of said outer surface of said elastically distortable annular retaining member.

4. A torque transmitting mechanical joint according to claim 1 wherein:

said one end of said outer joint member has a planar annular sealing surface, the plane of said planar annular sealing surface extending transversely through said central axis of said outer joint member;

said annular sealing member has an end sealing portion that extends generally radially inwardly from said outside diameter of said annular sealing member adjacent said one of said first end and said second end thereof, said end sealing portion of said annular sealing member sealingly engaging said planar annular sealing surface of said outer joint member in surface-to-surface contact; and said elastically distortable annular retaining member has an end seal retaining portion that extends generally radially inwardly from said first portion of said annular retaining member adjacent said one of said first end portion and said second end portion thereof, said end seal retaining portion of said elastically distortable annular retaining member engaging said end sealing portion of said annular sealing member to retain said end sealing portion of said annular sealing member in sealing engagement with said planar annular sealing surface of said outer joint member.

5. A torque transmitting mechanical joint according to claim 4 wherein said elastically distortable annular retaining member is an integrally formed member that is formed from a puncture-resistant thermoplastic material.

6. A torque transmitting mechanical joint according to claim 5 wherein said elastically distortable annular retaining member has a plurality of circumferentially spaced apart longitudinal slots extending thereinto from said one of said first end portion and said second end portion, each of said longitudinal slots terminating before it reaches said end seal retaining portion.

7. A torque transmitting mechanical joint according to claim 5 wherein said puncture-resistant thermoplastic material comprises a polyamide material.

8. A torque transmitting mechanical joint according to claim 7 wherein said elastically distortable annular retaining member is formed by injection molding.

9. A torque transmitting mechanical joint according to claim 1 wherein said elastically distortable annular retaining member is an integrally formed member that is formed from a puncture-resistant thermoplastic material.

10. A torque transmitting mechanical joint according to claim 9 wherein said elastically distortable member has a plurality of circumferentially spaced apart longitudinal slots extending thereinto from said one of said first end and said second end.

11. A torque transmitting mechanical joint according to claim 10 wherein said puncture-resistant thermoplastic material comprises a polyamide material.

12. A torque transmitting mechanical joint according to claim 11 wherein said elastically distortable annular retaining member is formed by injection molding.

13. A puncture-resistant elastically distortable boot restraint in combination with a rotatable torque transmitting mechanical joint of the plunging type having a driving joint member and a driven joint member, said driven joint member having an outside diameter, said puncture-resistant elastically distortable boot restraint comprising:

an annular sealing member formed from a flexible organic material, said annular sealing member having a predetermined outside diameter first end portion that is sealingly mounted to said outside diameter of said driven joint member and a second end that is sealingly mounted to said driving joint member; and an elastically distortable annular retaining member having a first end portion; and a second end portion adjacent said first end portion, one of said first end portion and said second end portion having a generally cylindrical annular portion being mounted to said predetermined outside diameter first end portion of said annular sealing member, said generally cylindrical annular portion having a predetermined inside diameter terminating in a generally radially inwardly extending rib, said radially inwardly extending rib contiguous said annular sealing member having a second predetermined inside diameter, said second predetermined inside diameter being normally less than said outside diameter of said annular sealing member such that said one of said first end portion and said second end portion of said elastically distortable boot restraint mounted to said annular sealing member is retained by the interference between said second predetermined inside diameter of said radially inwardly extending rib and said predetermined outside diameter first end portion of said annular sealing member to preserve the sealed mounting of said annular sealing member sealed to said driven joint member.

14. A boot restraint according to claim 13 wherein said driven joint member has an annular generally radially extending surface, and further wherein said predetermined outside diameter first end portion of said annular sealing member has a generally radially extending annular portion that is sealed to said annular generally radially extending surface of said driven joint member.

15. A boot restraint according to claim 14 further comprising:
a generally frustoconical portion having a small end and a large end, said small end of said generally frustoconical portion being attached to said generally radially extending annular portion of said predetermined outside diameter first end portion of said annular sealing member, said small end being adapted to restrain the outward movement of at least a portion of said annular sealing member as a result of centrifugal force resulting from the rotation of said rotatable torque transmitting mechanical joint.

16. A boot restraint according to claim 15 wherein said boot restraint is integrally formed from a thermoplastic material.

17. A boot restraint according to claim 16 wherein said thermoplastic material is a polyamide material.

18. A boot restraint according to claim 17 wherein said boot restraint is formed by injection molding.

19. A boot restraint according to claim 14 wherein said one of said first end portion and said second end portion comprises a plurality of circumferentially spaced apart longitudinal slots extending thereinto from said one of said first end portion and said second end portion, each of said longitudinal slots terminating before it reaches said generally radially extending annular portion of said predetermined outside diameter first end portion of said annular sealing member of said boot restraint.

20. A boot restraint according to claim 19 wherein said boot restraint is integrally formed from a thermoplastic material.

21. A boot restraint according to claim 20 wherein said thermoplastic material is a polyamide material.

22. A boot restraint according to claim 21 wherein said boot restraint is formed by injection molding.

23. A boot restraint according to claim 14 wherein said boot restraint is integrally formed from a thermoplastic material.

24. A boot restraint according to claim 23 wherein said thermoplastic material is a polyamide material.

25. A boot restraint according to claim 24 wherein said boot restraint is formed by injection molding.

26. A boot restraint according to claim 13 wherein said one of said first end portion and said second end portion comprises a plurality of circumferentially spaced apart longitudinal slots extending thereinto from said one of said first end portion and said second end portion.

27. A boot restraint according to claim 26 wherein said boot restraint is integrally formed from a thermoplastic material.

28. A boot restraint according to claim 27 wherein said thermoplastic material is a polyamide material.

29. A boot restraint according to claim 28 wherein said boot restraint is formed by injection molding.

30. A boot restraint according to claim 13 wherein said boot restraint is integrally formed from a thermoplastic material.

31. A boot restraint according to claim 30 wherein said thermoplastic material is a polyamide material.

32. A boot restraint according to claim 31 wherein said boot restraint is formed by injection molding.

* * * * *

UNITED STATES PATENT AND TRADEMARK OFFICE
CERTIFICATE OF CORRECTION

PATENT NO. : 4,767,381

DATED : August 30, 1988

INVENTOR(S) : Brown et al

It is certified that error appears in the above-identified patent and that said Letters Patent is hereby corrected as shown below:

Column 2, line 58, delete "DRAWING" and insert ----- DRAWINGS ----.

Column 2, line 61, delete "crosssection" and insert ---- cross-section ----.

Column 6, line 6, delete "wil" and insert ---- will ----.

Signed and Sealed this

Twenty-first Day of February, 1989

Attest:

DONALD J. QUIGG

Attesting Officer      Commissioner of Patents and Trademarks